(12) United States Patent
Cascaval et al.

(10) Patent No.: US 7,072,805 B2
(45) Date of Patent: Jul. 4, 2006

(54) MECHANISM FOR ON-LINE PREDICTION OF FUTURE PERFORMANCE MEASUREMENTS IN A COMPUTER SYSTEM

(75) Inventors: Gheorghe C. Cascaval, Carmel, NY (US); Evelyn Duesterwald, New York, NY (US); Sandhya Dwarkadas, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 10/688,293

(22) Filed: Oct. 17, 2003

(65) Prior Publication Data

US 2005/0086029 A1    Apr. 21, 2005

(51) Int. Cl.
*G06F 15/00*    (2006.01)
*H03F 1/26*    (2006.01)

(52) U.S. Cl. ...................................... 702/196; 717/131
(58) Field of Classification Search ................... 702/35, 702/182, 190, 196; 706/20, 21; 703/6; 717/131; 704/275; 395/586
See application file for complete search history.

(56) References Cited

U.S. PATENT DOCUMENTS

2004/0111708 A1 * 6/2004 Calder et al. ............... 717/131

OTHER PUBLICATIONS

Allan Snavely, et al. "Symbolic Jobscheduling with Priorities for a Simultaneous Multithreading Processor", *International Conference on Measurement and Modeling of Computer Systems(SIGMETRICS)*, Jun. 2002.
Sujay Parekh, et al. "Thread-Sensitive Scheduling for SMT Processors", *University of Washington Technical Report*, pp. 1-18; 2000; and.
Christos D. Antonopoulos, et al. "Scheduling Algorithms with Bus Bandwidth Consideration for SMP's", *International Conference on Parallel Processing*, pp. 1-21; Tawain, Oct. 2003.

* cited by examiner

*Primary Examiner*—John Barlow
*Assistant Examiner*—John Le
(74) *Attorney, Agent, or Firm*—Scully, Scott, Murphy & Persser; Douglas W. Cameron, Esq.

(57) ABSTRACT

Disclosed are a method and system for predicting future values of a target metric associated with a task executed on a computer system. The method includes the steps of, over a given period of time, measuring at least one defined metric, transforming that measurement into a value for a predictor source metric, and using the value for the predictor source metric to obtain a predicted future value for said target metric. The preferred embodiment of this invention provides a flexible performance multi-predictor to solve the problem of providing accurate future behavior predictions for adaptive reconfiguration systems. The multi-predictor makes predictions about future workload characteristic by periodically reading available hardware counters. Also disclosed is a method and system for periodically reconfiguring an adaptive computer system by rescheduling tasks based on future behavior predictions.

1 Claim, 2 Drawing Sheets

MECHANISM FOR ON-LINE PREDICTION OF FUTURE PERFORMANCE MEASUREMENTS IN A COMPUTER SYSTEM

BACKGROUND OF THE INVENTION

Field of the Invention

This invention generally relates to adaptive computer systems. More specifically, the invention relates to a flexible performance multi-predictor that solves the problem of providing accurate future behavior predictions for adaptive reconfiguration systems.

Adaptive computer systems attempt to improve performance and/or reduce power consumption by periodically reconfiguring the system according to the current resource requirements and/or characteristics of the running workload. Such reconfiguration may be a reconfiguration of the hardware, such as the resizing of computer resources (e.g., resizing of caches or issue width), or it may be a reconfiguration of the software (dynamic optimization), such as the tuning of a process or thread scheduling policy. The reconfiguration logic may be implemented in software or in hardware.

The purpose of the reconfiguration is to exploit the variability of behavior in a running workload to improve performance or to reduce power. For example, if the workload currently under-or over-utilizes certain hardware structures, hardware reconfiguration may down-or upsize them. Software reconfiguration logic may reconfigure the workload through scheduling decisions to better exploit the available hardware. In either case, the reconfiguration logic can initiate a reconfiguration based on observed or expected changes in the running workload characteristics.

A common way to assess workload characteristics is through hardware performance counters. These counters are typically available on modem microprocessors to provide statistics about resource usage and workload composition. However, hardware counters only provide characterization post-mortem; that is, after the behavior has been observed. In order to effectively reconfigure a computer system, reconfiguration decisions should be based on future rather than past behavior.

Various reconfiguration solutions that have been pursued in the past are reactive (rather than predictive) adaptive systems. In a reactive adaptive system, the reconfiguration logic tracks current workload characteristics either through existing hardware counters or through specialized tracking hardware. If it is found that the current behavior deviates from the behavior at the last system reconfiguration by more than a threshold value, a new reconfiguration is triggered to match the changed workload characteristics. Such a reactive strategy works well if the workload behavior is relatively stable with few distinct behavior changes. However, in a workload that is characterized by high variability, a reactive system will always lag behind the latest behavior changes and thus never reach an optimal configuration for the current behavior.

One prior approach that attempts to make predictive rather than reactive reconfiguration decisions is disclosed in "Phase Tracking and Prediction," In Proceedings of the 30th Annual International Symposium on Computer Architecture (ISCA), Jun. 9–11, 2003, by T. Sherwood, S. Sair and B. Calder (Sherwood, et al.). In this approach, a dedicated hardware structure is developed to track the so called basic block vectors. Basic block vectors are used to determine where in the program code the current workload executes. Assuming that workload behavior is a function of the current basic block vector, a classification scheme is used to classify different basic block vectors into different phases and each phase is associated with a particular value of the performance metric one wishes to predict. The dedicated hardware structure includes logic for predicting the next phase (in terms of the basic block vectors) using a Markov model predictor. The performance value associated with the predicted next phase is then used to reconfigure the adaptive system.

One limitation of this approach is that it requires specialized dedicated hardware structures. Moreover, the system disclosed in Sherwood, et al. is based on an assumption that if one metric is stable, other metrics are also stable. This assumption limits the prediction accuracy of the Sherwood, et al. approach.

There also has been a large body of related work on predicting branch outcome in a running computer program. Branch predictors generally use some form of a hash table that stores predicted branch outcome based on a specific history of branches that have most recently executed. Branch predictors predict the outcome of a specific event (the execution of a specific branch. However, branch predictors only predict branch outcomes based on branch execution history.

SUMMARY OF THE INVENTION

An object of this invention is to support adaptive reconfiguration computer systems by providing a mechanism to determine, through prediction, expected changes in the workload characteristics.

Another object of the invention is to use hardware that typically exists on modern computer systems to predict workload characteristics.

A further object of the present invention is to track directly one performance metric of an adaptive computer system, and to use that one metric to make predictions along several other performance metrics.

These and other objectives are attained with a method and system for predicting future values of a target metric associated with a task executed on a computer system. The method comprises the steps of, over a given period of time, measuring at least one defined metric, transforming that measurement into a value for a predictor source metric, and using the value for the predictor source metric to obtain a predicted future value for said target metric.

The preferred embodiment of this invention provides a flexible performance multi-predictor to solve the problem of providing accurate future behavior predictions for adaptive reconfiguration systems. The multi-predictor makes predictions about future workload characteristics by periodically reading available hardware counters. Any suitable reconfiguration logic and reconfiguration mechanism may be used in the practice of this invention. The invention is applicable to a plurality of dynamic and adaptive reconfiguration scenarios.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The preferred embodiment of this invention is to use the performance multi-predictor in a software adaptive environment. One embodiment of the invention addresses the problem of making adaptive task scheduling decisions in an operating system to control the processor temperature. The scheduling objective is to lower the thermal profile of a processor; that is, to prevent the processor from exceeding a certain temperature threshold. There exists an operating system scheduler per processor to schedule all tasks that are requested to be run on that processor. Each task runs for a given time quantum and the scheduling decision is to decide which task to run next while optimizing overall throughput, preserving fairness among the tasks, and reducing the thermal profile. This is achieved by the scheduler through a dynamic priority scheme that favors "cooler" tasks as the processor temperature rises. A task's contribution to the processor temperature varies depending on the type of task activity (e.g. memory versus CPU bound task). The performance multi-predictor plays a key role by providing a mechanism that enables the scheduler to make scheduling decisions based on the future temperature contribution of each task.

Figure 1:
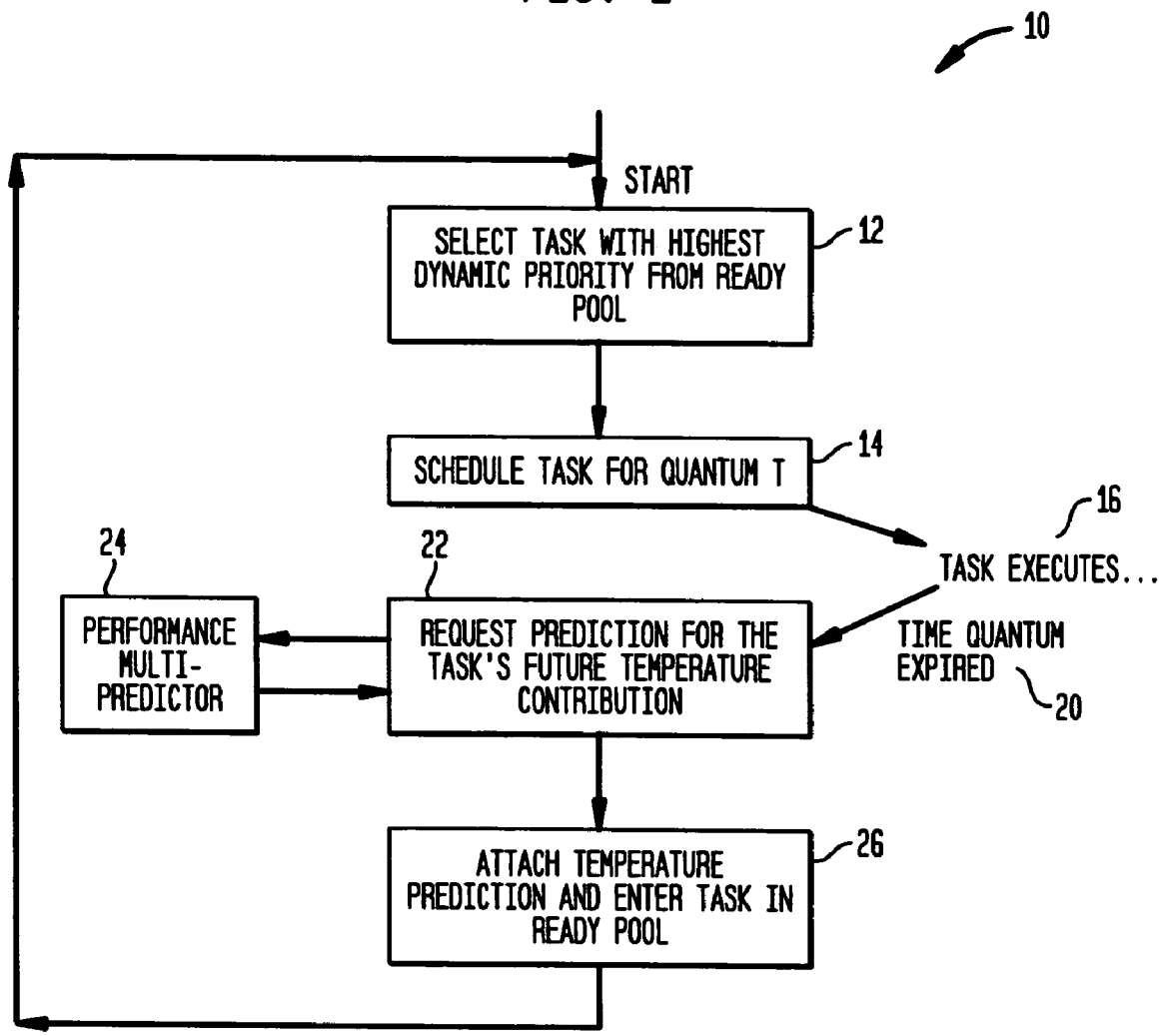
FIG. 1 illustrates an adaptive scheduling process which may utilize a preferred embodiment of this invention.

FIG. 1 illustrates this preferred embodiment. The Figure shows the main scheduler loop 10. During each iteration of that loop, the scheduler, at step 12, selects from the pool of ready-to-execute tasks the task with the highest dynamic priority. Tasks have a static priority that is usually provided by the application and a dynamic priority that is recomputed during each interval based on current processor temperature and predicted temperature contribution. In addition, there may be other factors in the dynamic priority contribution, such as the degree of interactiveness of a task. The selected task is then scheduled, at step 14, for a fixed time quantum. Once the time quantum expires, as represented by steps 16 and 20, the scheduler, at step 22, queries the performance multi-predictor 24 to provide a prediction for the future temperature contribution. At step 26, the prediction is attached to the task before the task is re-entered into the ready pool.

Figure 2:
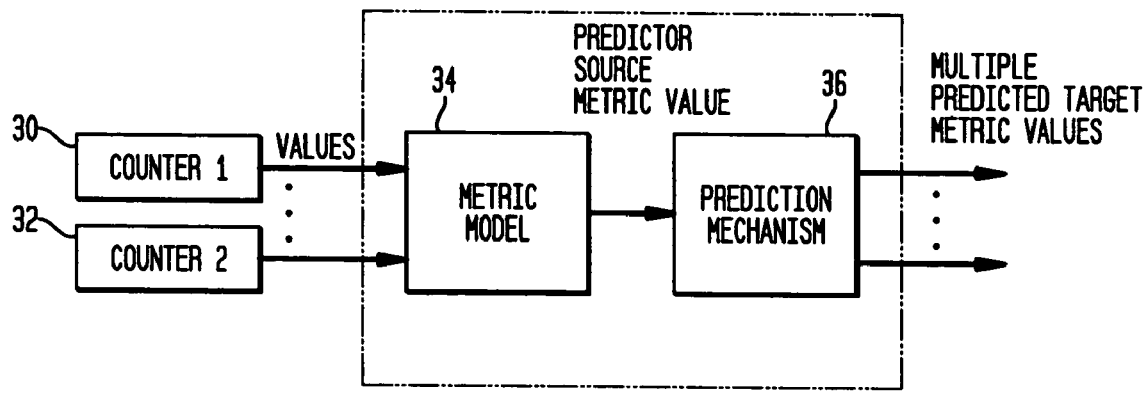
FIG. 2 shows in greater detail the performance multi-predictor illustrated in FIG. 1.

The multi-predictor 24 from FIG. 1 is expanded in FIG. 2 to show its major components. The multi-predictor reads one or more existing system hardware counters, generally referenced at 28, that track the current utilization of hardware resources by each task that is running. Hardware counters to track hardware resource utilization are available on all modern computer systems. Each hardware counter can be programmed to track one of a plurality of metrics such as the number of instructions executed or the number of cache misses experienced. A system may have one or more hardware counters, and for example, two are specifically shown in FIG. 2 and referenced at 30 and 32. The multi-predictor 24 reads one or more of the counters 28 at regular intervals, e.g., every 10 milliseconds, or at preset events, such as every 100,000 committed instructions. The multi-predictor 24 includes a metric model 34 that is used to transform the available hardware counter measurements into a single predictor source metric. Any suitable metric model may be used in the practice of this invention and any existing model that uses hardware counters to model other performance metrics can be used. For example, a power model that can be used is disclosed in "Run-time power estimation in high-performance microprocessors," In Proceedings of the International Symposium on Low Power Electronics and Design (ISLPED), Aug. 6–7, 2002, by R. Josep and M. Martonosi (Josep, et al.). In the preferred embodiment, the single predictor source metric is the temperature contribution.

The single predictor source metric is then used as input to the actual prediction mechanism 36 of the multi-predictor, and mechanism 36 then produces a plurality of predicted target metric values. The preferred embodiment uses only a single target metric, which is identical to the source metric: the temperature contribution.

Figure 3:
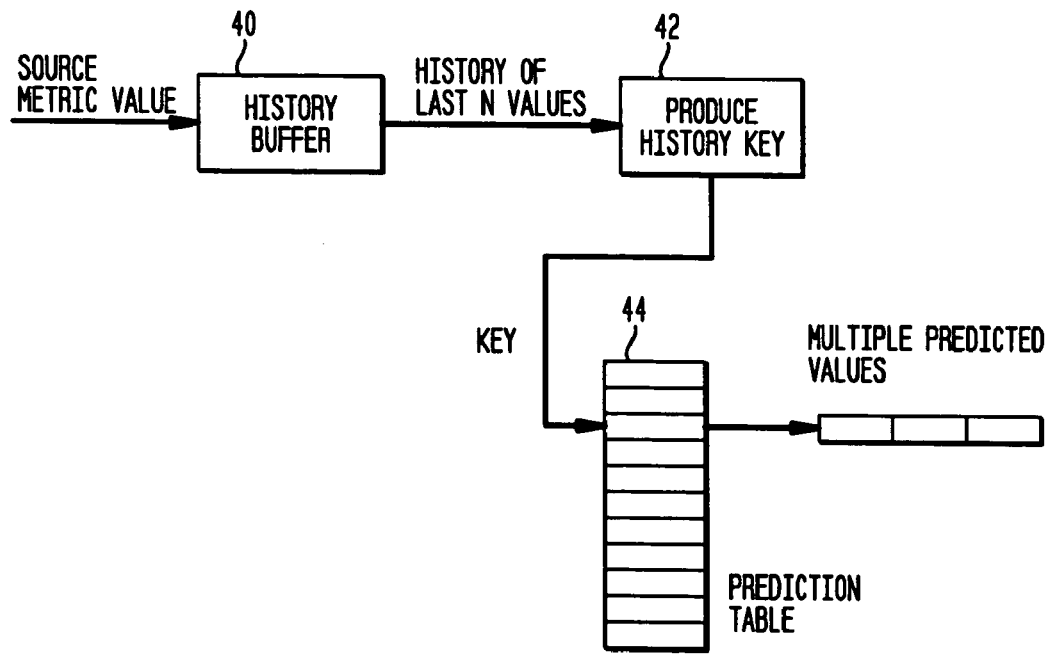
FIG. 3 shows details of the prediction mechanism of FIG. 2.

FIG. 3 shows the details of the prediction mechanism 36 from FIG. 2. The prediction mechanism receives the source metrics values as input as shown in FIG. 2 and internally stores these values in a history buffer 40. The history buffer is a circular buffer (queue) of size N so that it can be used to retrieve the last N source metric values at any time. This history is processed at 42 to produce an index key. The mapping from histories 40 to index keys is such that there exists a unique index key for each history value but not necessarily vice versa (i.e., the range of index values may be smaller than the range of possible history values). A hash function is an example of an index key producing function. The index key is then used to index into a prediction table 44. The prediction table holds values of target metrics that have been observed to follow the history when the index key was last seen. If an entry is found, the prediction mechanism will return the entry as the predicted set of target metric values.

The prediction table 44 requires a learning period to populate table entries. The table population takes place by passing the last observed target metric values to the prediction mechanism 36 along with a request for a new prediction. The last observed target metric values are used to update the table entry for the previous history.

An advantage of this table based scheme is that it exploits repeatable program behavior. Since programs spend most of their time executing loops, repeatable behavior is expected, in which case the table does not require a long time to be populated and is likely to provide accurate performance predictions.

In the preferred embodiment, at the end of each scheduling interval, a prediction is made for the future behavior of the task that just finished its scheduling interval. The prediction is fed into a thermal model that produces an expected temperature contribution for this task. This temperature contribution is used to classify the task as either a hot or cold task. When deciding on the next task to schedule, the system takes into account the current process temperature and the hot/cold task classification and chooses a task that best balances the thermal profile of the processor.

It may be noted that the entire prediction mechanism can be built in software (though building it in hardware may be desirable). In the software prediction mechanism, the only hardware requirement is access to the hardware counters as they are typically found in modem computer systems.

The preferred embodiment of the present invention, as described above in detail, differs from the approach disclosed in Sherwood, et al. in several ways. First, the preferred embodiment, is based solely on existing hardware performance counters and does not require any specialized dedicated hardware structures. The entire invention can be implemented in software using existing hardware. Second, the preferred embodiment of the invention tracks one performance metric directly (the source metric) and is capable of making predictions along several other performance metrics (the target metrics). To make multiple predictions, the invention may exploit the fact that the periodicity of behavior along different metrics tends to be correlated (behavior patterns of different metrics repeat at the same rate). Sherwood et al., in contrast, make the more constrained assumption that if one metric is stable other metrics are also stable. Since the assumption used in this invention is more relaxed (the periodicity in metric variation is correlated, not the values themselves) it is more likely to be met by realistic workloads, yielding a better overall prediction accuracy.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of predicting future values of a target metric associated with a task executed on a computer system, comprising the steps:
   over a given period of time, measuring at least one defined metric; transforming said measurement into a value for a predictor source metric; and
   using the value for the predictor source metric to obtain a predicted future value for said target metric;
   wherein the using step includes the step of providing a set of possible future values, including the steps of:
   i) identifying values that the target metric had at different times;
   ii) for each of said identified values of the target metric, determining the value that the source metric had before the time at which the target metric had the identified value; and
   iii) using said identified values of the target metric as the possible future values.

* * * * *